US011326580B2

(12) United States Patent
Zhai et al.

(10) Patent No.: US 11,326,580 B2
(45) Date of Patent: May 10, 2022

(54) SYSTEM AND METHOD FOR CONTROLLING GENERATOR ROTOR LOCKING PIN

(71) Applicant: JIANGSU GOLDWIND SCIENCE & TECHNOLOGY CO., LTD., Jiangsu (CN)

(72) Inventors: Endi Zhai, Jiangsu (CN); Hongfeng Li, Jiangsu (CN); Kang Li, Beijing (CN); Xingang Zhang, Jiangsu (CN); Ye Li, Jiangsu (CN)

(73) Assignee: JIANGSU GOLDWIND SCIENCE & TECHNOLOGY CO., LTD., Jiangsu (CN)

(*) Notice: Subject to any disclaimer, the term of this patent is extended or adjusted under 35 U.S.C. 154(b) by 220 days.

(21) Appl. No.: 16/485,656

(22) PCT Filed: May 3, 2018

(86) PCT No.: PCT/CN2018/085412
§ 371 (c)(1),
(2) Date: Aug. 13, 2019

(87) PCT Pub. No.: WO2019/128016
PCT Pub. Date: Jul. 4, 2019

(65) Prior Publication Data
US 2019/0360466 A1 Nov. 28, 2019

(30) Foreign Application Priority Data
Dec. 28, 2017 (CN) .......................... 201711462367.5

(51) Int. Cl.
F03D 13/10 (2016.01)
F03D 13/30 (2016.01)
F03D 15/10 (2016.01)
F03D 7/04 (2006.01)

(52) U.S. Cl.
CPC .............. F03D 13/10 (2016.05); F03D 13/30 (2016.05); F03D 7/04 (2013.01); F03D 15/10 (2016.05);
(Continued)

(58) Field of Classification Search
CPC .............. F03D 13/10; F03D 15/10; F03D 7/04
See application file for complete search history.

(56) References Cited

U.S. PATENT DOCUMENTS 6,768,100 B1 7/2004 Brown
2010/0194114 A1* 8/2010 Pechlivanoglou .... F03D 7/0248
290/55

(Continued)

FOREIGN PATENT DOCUMENTS

CN 102226445 A 10/2011
CN 202370759 A 8/2012

(Continued)

OTHER PUBLICATIONS

Translation of WO201302112_A1 from Espacenet (Year: 2013).*

(Continued)

Primary Examiner — Courtney D Heinle
Assistant Examiner — Ryan C Clark

(57) ABSTRACT

A system for controlling a generator rotor locking pin, comprising a fixed locking pin and a rotor formed with a locking hole, and further comprising a detection reference component synchronously rotating with the rotor and formed with a detection hole, the detection hole radially corresponding to the locking hole; an optical quantity detection component fixed with respect to the rotor; and a control component configured to output a first control instruction to a rotor driving component according to a position signal of the detection hole obtained by the optical quantity detection component. The detection hole is used as an object to be (Continued)

detected, so that the circumferential relative position relationship of the locking hole with respect to the locking pin can be accurately determined, to output the first control instruction to the rotor driving component, thereby accurately centering the locking pin and the locking hole along with the rotation of the rotor. Moreover, in addition to obtaining an accurate centering precision, this solution greatly increases the centering efficiency. On this basis, the present invention further provides a method for controlling a generator rotor locking pin.

13 Claims, 3 Drawing Sheets

(52) U.S. Cl.
CPC ..... *F05B 2260/30* (2013.01); *F05B 2270/326* (2013.01)

(56) References Cited

U.S. PATENT DOCUMENTS

| | | | | |
|---|---|---|---|---|
| 2012/0266708 | A1* | 10/2012 | Valero Lafuente | ..... F03D 80/50 74/411.5 |
| 2017/0051722 | A1* | 2/2017 | Knoop | ................... F03D 1/065 |

FOREIGN PATENT DOCUMENTS

| | | |
|---|---|---|
| CN | 202451374 U | 9/2012 |
| CN | 202991361 U | 6/2013 |
| CN | 103410683 A | 11/2013 |
| CN | 103644082 A | 3/2014 |
| CN | 205330887 U | 6/2016 |
| CN | 206000679 U | 3/2017 |
| EP | 2905467 A1 | 8/2015 |
| EP | 2759700 B1 | 3/2016 |
| WO | 2013/032112 A1 | 3/2013 |
| WO | WO-2013032112 A1 * | 3/2013 ............. F03D 80/00 |

OTHER PUBLICATIONS

International Search Report dated Sep. 17, 2018; PCT/CN2018/085412.

The First Chinese Office Action dated Oct. 31, 2019; Appln. No. 201711462367.5.

The Extended European Search Report dated Dec. 17, 2019; Appln. No. 18893700.7.

* cited by examiner

SYSTEM AND METHOD FOR CONTROLLING GENERATOR ROTOR LOCKING PIN

The present application is a national phase of international application No. PCT/CN2018/085412 filed on May 3, 2018, which claims priority to Chinese patent application No. 201711462367.5, titled "SYSTEM AND METHOD FOR CONTROLLING LOCKING PIN FOR ROTOR OF GENERATOR", filed with the China National Intellectual Property Administration on Dec. 28, 2017, both of which are incorporated herein by reference in its entirety.

FIELD

The present disclosure relates to the technical field of wind power generators, and in particular to a system and a method for controlling a locking pin for a rotor of a generator.

BACKGROUND

With the development of large-scale wind turbine, the installation of blades of the wind turbine becomes more difficult. A manner in which the blades are separately installed has been adopted gradually. During the separate installation of the blades, a hub of the wind turbine is required to perform a rotation cooperation (that is, a turning operation) to fit the blade installation.

It is well known that the rotor of the generator should be locked during a lifting process of a single blade. Generally, a locking pin is used for locking a conventional turning system and the rotor of the generator. The locking pin is fixed on a fixed shaft of the generator, and a locking hole matching the locking pin is arranged on the rotor of the generator. That is, the locking pin is fixed and the locking hole can be rotated. In a case that the rotor of the generator needs to be locked, the rotor of the generator may be rotated to a position that the locking hole of the rotor and the locking pin are aligned with each other. Obviously, the accuracy of the alignment of the locking hole of the rotor and the locking pin is a key issue for quickly and reliably subsequent operations.

At present, the alignment of the locking pin of the rotor is mainly performed based on an observation of an operator. Due to an inevitable deviation of the observation by naked eyes, it is difficult to ensure the accuracy of the alignment of the locking pin and the locking hole, and the time for performing the alignment cannot be effectively controlled.

In view of this the design of the present turning system to effectively needs to be optimized to address the issue that the accuracy of the alignment of the locking pin in the turning system cannot be accurately controlled, such that subsequent operations such as blade mounting can be ensured to be performed quickly and reliably.

SUMMARY

To address the above technical issues, a method and a device for controlling a hydraulically controlled turning system for a rotor of a generator is provided according to the present disclosure, which can dynamically correct an accumulated error during a working process of the hydraulically controlled turning system, thereby greatly improving the operational accuracy and reliability of the turning system.

A system for controlling a locking pin for a rotor of a generator is provided according to the present disclosure, which includes the locking pin that is fixedly arranged and the rotor on which a locking hole is provided; the system further includes:

a detecting reference member rotatable in synchronization with the rotor, where a detecting hole is provided in the detecting reference member, and the detecting hole is arranged in correspondence with the locking hole in a radial direction;

an optical quantity detecting member, where the optical quantity detecting member is fixedly arranged with respect to the rotor; and a control member, configured to output a first control instruction to a driving member of the rotor to align the locking pin with the locking hole according to a position signal of the detecting hole acquired by the optical quantity detecting member.

Preferably, the control member is further configured to output a second control instruction to a driving member of the locking pin to lock the rotor according to the position signal of the detecting hole acquired by the optical quantity detecting member.

Preferably, the position signal includes at least three position signals, which are sequentially acquired in a rotation of the rotor; where the at least three position signals include a first position signal, being a position signal acquired in a case that a signal acquisition path of a detecting portion is directed to a physical portion of the detecting reference member that is on an upper side of the detecting hole;

a second position signal, being a position signal acquired in a case that the signal acquisition path of the detecting portion is in directed to the detecting hole; and a third position signal, being a position signal acquired in a case that the signal acquisition path of the detecting portion is directed to a physical portion of the detecting reference member that is on a lower side of the detecting hole.

Preferably, the control member is configured to output the first control instruction the driving member of the rotor for rotating a preset angle toward a second direction according to the first position signal, the second position signal and the third position signal that are acquired in the rotation of the rotor in a first direction; wherein the preset angle equals to a half of a rotation angle of the detecting portion of the optical quantity detecting member rotatable in the detecting hole with respect to the rotor.

Preferably, the optical quantity detecting member is specifically an infrared sensor, an ultrasonic sensor or a laser sensor.

Preferably, the detecting portion of the optical quantity detecting member is arranged to be exactly aligned with a reference circle of the detecting hole.

Preferably, the detecting reference member is the rotor, and the optical quantity detecting member is fixedly arranged on a fixed shaft of the generator.

Preferably, a plurality of locking holes and a plurality of detecting holes are uniformly distributed in a circumferential direction, and the diameter of the reference circle of the detecting hole is smaller than the diameter of a reference circle of the locking hole.

According to the present disclosure, a method for controlling the locking pin for the rotor of the generator is provided, which includes:

determining a preset angle, wherein the preset angle equals to a half of a rotation angle of a detecting position rotatable in a detecting hole with respect to the rotor; and outputting, according to a position signal of the detecting hole acquired by an optical quantity detecting member, a first control instruction to a driving member of the rotor to align the locking pin with the locking hole.

Preferably, after the outputting a first control instruction to a driving member of the rotor, the method further include: outputting a second control instruction to a driving member of the locking pin to lock the rotor.

Preferably, the position signal includes at least three position signals, which are sequentially acquired in a rotation of the rotor; where the at least three position signals includes:

a first position signal, being a position signal acquired in a case that a signal acquisition path of the detecting portion is directed to a physical portion of a detecting reference member that is on an upper side of the detecting hole;

a second position signal, being a position signal acquired in a case that the signal acquisition path of the detecting portion is directed to the detecting hole; and a third position signal, being a position signal acquired in a case that the signal acquisition path of the detecting portion is directed to a physical portion of the detecting reference member that is on a lower side of the detecting hole.

Preferably, the method further includes: outputting, by the control member, the first control instruction to the driving member of the rotor for rotating the preset angle toward a second direction according to the first position signal, the second position signal and the third position signal that are acquired in the rotation of the rotor in a first direction; where the preset angle equals to a half of a rotation angle of the detecting portion of the optical quantity detecting member rotatable in the detecting hole with respect to the rotor.

Compared with the conventional technology, an automatic alignment reference is provided according to the present disclosure. The detecting hole is provided in the detecting reference member rotatable in synchronization with the rotor, and the position signal of the detecting hole is detected in real time during the process of alignment by rotating using the optical quantity detecting member that are fixedly arranged. According to the present solution, the detecting hole is arranged in correspondence with the locking hole in the radial direction, therefor, such that an accurate relative position relationship of the locking hole with respect to the locking pin in the circumferential direction can be determined by using the detecting hole as an object to be detected. The first control instruction can be outputted to the driving member of the rotor, so that the locking pin and the locking hole can be accurately aligned with each other with the rotation of the rotor. In addition to a more accurate alignment, an efficiency of alignment is also greatly improved according to the present solution.

According to a preferred embodiment of the present disclosure, at least three position signals are acquired in sequence in the rotation of the rotor, specifically, the position signal acquired in a case that the signal acquisition path of the detecting portion is aligned with the detecting hole, the position signal acquired in a case that the signal acquisition path of the detecting portion is aligned with the physical portion of the detecting reference member on the upper side of the detecting hole, and the position signal acquired in a case that the signal acquisition path of the detecting portion is directed to the physical portion of the detecting reference member on the lower side of the detecting hole. With such arrangement, the processing efficiency of the alignment can be greatly improved.

According to another preferred embodiment of the present disclosure, the detecting reference member is the rotor, and the optical quantity detecting member corresponding thereto is fixedly arranged on the fixed shaft of the generator. In other words, no additional designed component is needed, and the key idea of the present disclosure can be realized by using an existing structural component. The cost for implementing the solution can be controlled on the basis of a more accurate alignment.

BRIEF DESCRIPTION OF THE DRAWINGS

For clearer illustration of technical solutions according to embodiments of the present disclosure or conventional techniques, hereinafter, the drawings that accompany embodiments of the present disclosure or conventional techniques are briefly described. Apparently, the drawings in the following descriptions are only some embodiments of the present disclosure, and those skilled in the art may obtain other drawing without creative works based on the drawings.

REFERENCE NUMERALS IN FIGS. 1 TO 4

1 rotor, 11 locking hole,
12 detecting hole, 2 locking pin,
3 optical quantity detecting member, 4 control member,
5 driving member of rotor, 6 driving member of locking pin.

DETAILED DESCRIPTION

For a better understanding of the present disclosure to those skilled in the art, the present disclosure will be further described in detail below in conjunction with the accompanying drawings and specific embodiments.

Figure 1:
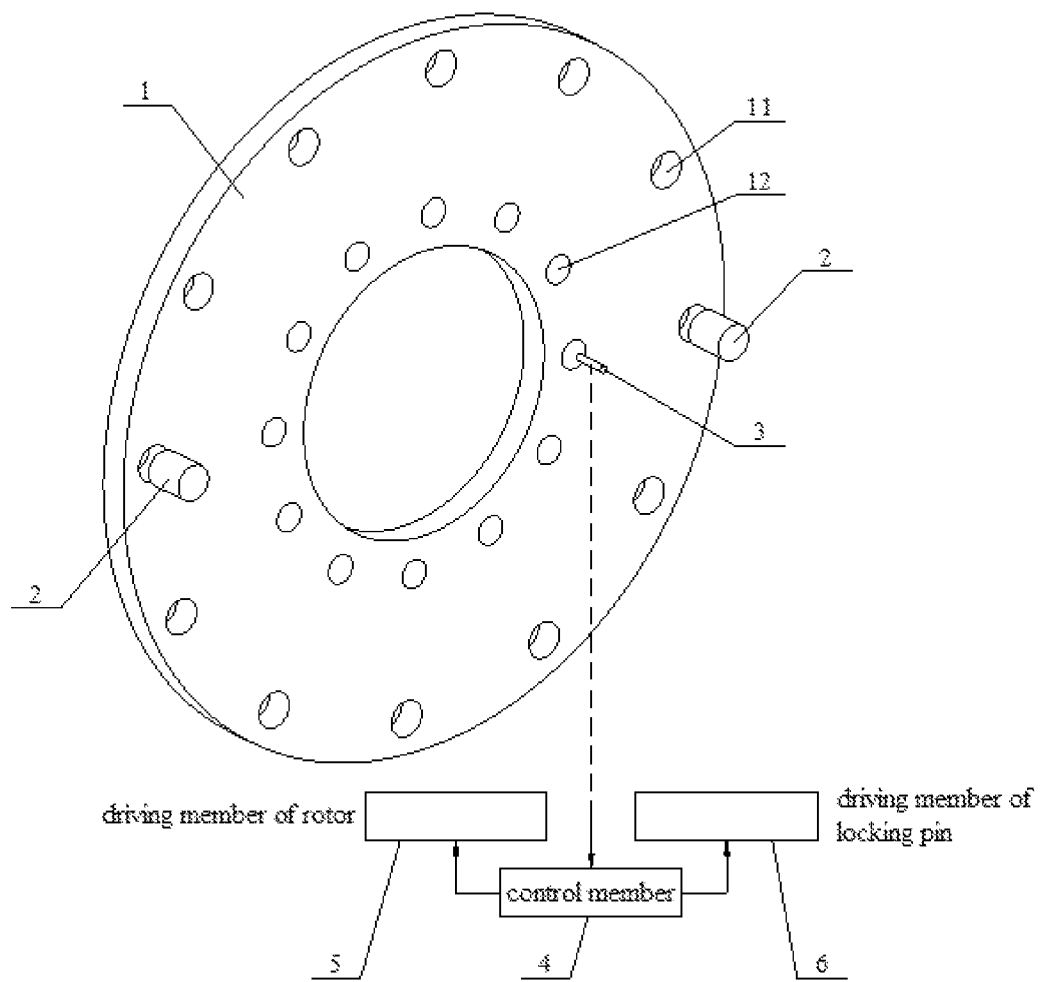
FIG. 1 is a schematic view showing the cooperation between structural members of a system for controlling a locking pin for a rotor of a generator according to an embodiment.

Reference is made to FIG. 1, which is a schematic view showing the cooperation between structural members a system for controlling a locking pin for a rotor of a generator according to an embodiment of the present disclosure. As shown in FIG. 1, the control system may include a locking pin 2, a rotor 1, an optical quantity detecting member 3 and a control member 4.

Twelve uniformly distributed locking holes 11 are opened in an upper circumference of the rotor 1, and a corresponding locking pin 2 is provided to each of the locking holes 11. It should be understood that the number of the locking holes 11 may be other plural, which may be comprehensively set according to factors such as parameters of the whole machine. In an actual working process, an alignment refers to a case that a centering line of the locking pin superposes with a centering line of the locking hole, where the locking pin 2 may be fixedly arranged on a fixed shaft of the generator (not shown), and it should be understood that the locking pin 2 may be fixedly arranged on other fixed members of the generator, which can also meet basic functional requirements for aligning the locking pin with the locking hole 11 to realize unit locking.

In the embodiment, a detecting reference member rotatable in synchronization with the rotor is further included, and a detecting hole 12 is opened in the detecting reference member, where the detecting hole 12 is arranged in correspondence with each of the locking holes 11 in a radial direction, thereby establishing a one-to-one correspondence relationship between the object to be controlled and the detecting reference. For less additional member, the rotor 1 may preferably serve as the detecting reference member according to the present embodiment. The detecting reference member may be a member that is provided independently to the rotor and is rotatable in synchronization with the rotor.

As shown in FIG. 1, the number of the detecting holes 12 is also twelve, and each of the detecting holes 12 is arranged in correspondence with each of the locking holes 11 in the radial direction. It should be noted that "arranged in correspondence with in the radial direction" means that the detecting hole has a correspondence relationship with the locking hole in the radial direction, and is not limited to a case that the locking hole and locking pin are located in a same radial line passing through a rotation center of the rotor as shown in the Figure. Since the rotor has sufficient rigidity, the relative position relationship between the detecting hole and the locking hole does not change, and the locking pin 2 and the optical quantity detecting member 3 are also fixed. That is to say, based on the relative position between the detecting hole and the locking hole provided according to the present embodiment, the detecting hole and the locking hole rotate in the same amplitude in a rotation of the rotor. In a case that a signal acquisition path of the optical quantity detecting member 3 is centered with the detecting hole 12, the locking pin 2 and the locking hole 11 are aligned.

Preferably, the detecting portion of the optical quantity detecting member 3 is arranged to be exactly aligned with a reference circle of the detecting holes 12. It is more convenient and reliable to implement the solution based on a typical geometry. In addition, the number of the locking hole and the number of the detecting hole are each plural, and the locking holes and the detecting holes are uniformly distributed in a circumferential direction. The diameter of the reference circle of the detecting hole is smaller than the diameter of the reference circle of the locking hole, which may facilitate the overall layout.

The optical quantity detecting member 3 is fixedly arranged with respect to the rotor 1, and may be arranged on the fixed shaft of generator together with the locking pin 2, or may be arranged on another member that is fixed with respect to the rotor. The optical quantity detecting component 3 performs measurement based on an optical principle, and has the characteristics of anti-interference, high-speed transmission, and remote detection. During the detecting process, in a case that the signal acquisition path is directed to a physical structure and a void structure respectively, respective different signals can be fed back by a sensor. For example, an infrared sensor, an ultrasonic sensor, or a laser sensor may be selected.

Figure 2:
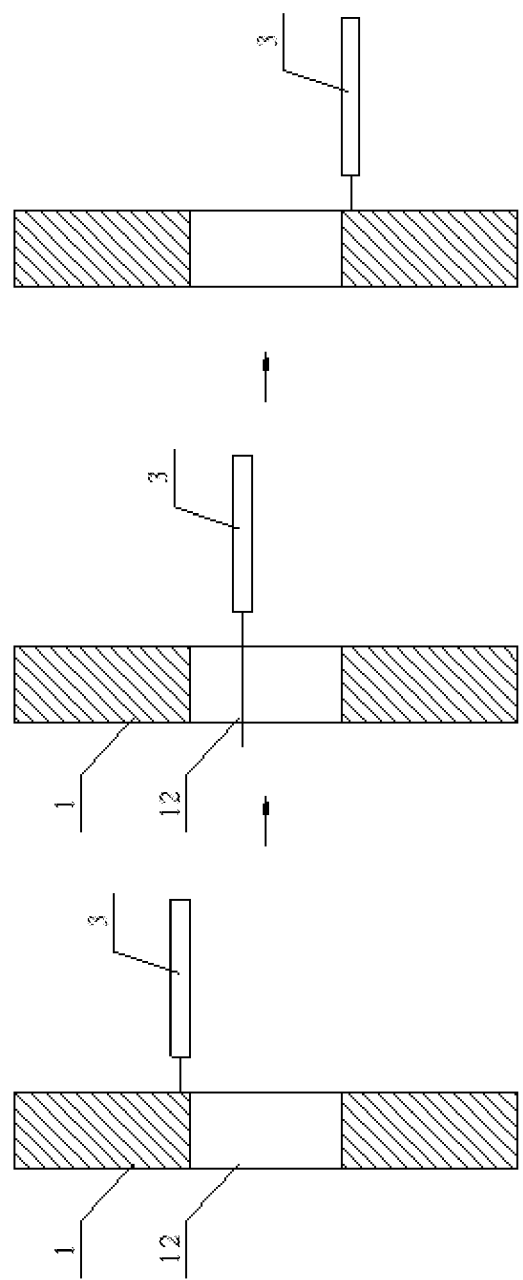
FIG. 2 is a schematic view showing a working principle of an ultrasonic sensor according to an embodiment.

Details are shown in FIG. 2, which is a schematic view showing a working principle of a laser sensor. In a case that the signal acquisition path of the sensor is directed to the detecting hole 12, the sensor cannot receive a reflected light, and there is no signal feedback in such case. If the signal acquisition path of the sensor is directed to a physical structure that is on an upper side or on a lower side of the detecting hole 12, the sensor can receive a light reflected by the surface, and there is a signal feedback in such cases.

According to the position signal of the detecting hole acquired by the ultrasonic sensor (the optical quantity detecting member 3), the control member 4 is configured to output a first control instruction to a driving member of the rotor 5, so that the locking pin 2 and the locking hole 11 are exactly aligned with each other with the rotation of the rotor 1.

Further, according to the position signal of the detecting hole 12 acquired by the ultrasonic sensor (the optical quantity detecting member 3), the control member 4 is configured to output a second control instruction to a driving member of the locking pin 6 to lock the rotor 1. Thereby, the locking operation of the wind turbine is realized. It should be understood that the driving member of the rotor 5 and the driving member of the locking pin 6 are not the key ideas of the present disclosure, details of which are omitted herein.

As well known in the art, the outer dimensions of the rotor 1 and the self-weight of the rotor 1 are large, and a process of inserting the locking pin 2 cannot exclude the existence of a small moment of inertia. In order to obtain a more stable locking operation, multiple locking pin 2 can be provided, preferably, both the number of the locking holes and that of the detecting holes are 2N, and the number of the locking pins that are symmetrically arranged in the radial direction is 2n; where N≥n≥1. With such arrangement, the locking pins 2 with even number are symmetrically arranged in the radial direction, so as to effectively distribute the load.

Figure 4:
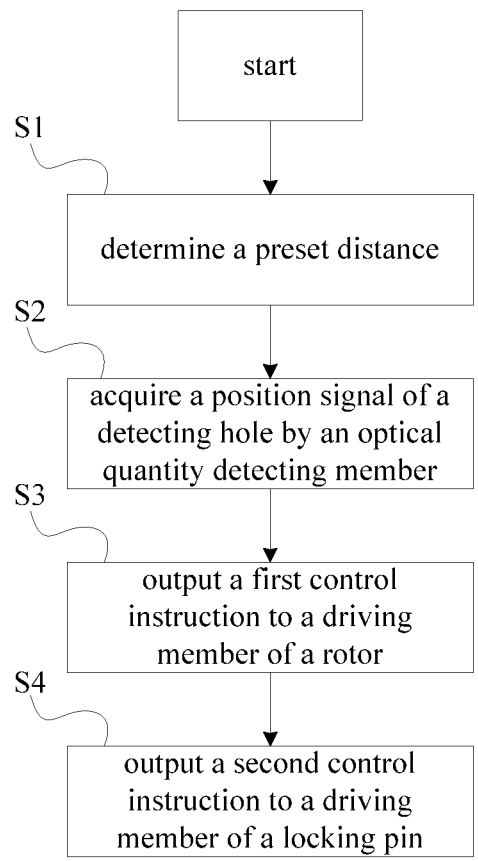
FIG. 4 is a flow chart of a method for controlling a locking pin for a rotor of a generator according to an embodiment.

In addition to the above control system, a method for controlling the locking pin for a rotor of a generator is further provided according to the present embodiment. As shown in FIG. 4, the control method includes the following steps S1 to S3.

S1. a preset angle is determined.

Specifically, the preset angle equals to a half of a rotation angle L of the detecting positon rotatable in a detecting hole 12 with respect to the rotor 1; the preset angle may be stored in a memory unit integrated in a control member 4 or in a memory unit independent of the control member 4.

S2. a position signal of the detecting hole 12 is acquired by an optical quantity detecting member 3.

S3. a first control instruction is outputted to a driving member of the rotor 5 to align the locking pin 2 with the corresponding locking hole 11 according to the position signal of the detecting hole 12 acquired by the optical quantity detecting member 3.

In order to further improve the automation degree and processing efficiency of the control solution, the method may further include the following.

S4. a second control instruction is outputted to a driving member of the locking pin 6 to lock the rotor 1 after the first control instruction has been outputted to the driving member of the rotor 5.

Figure 3:
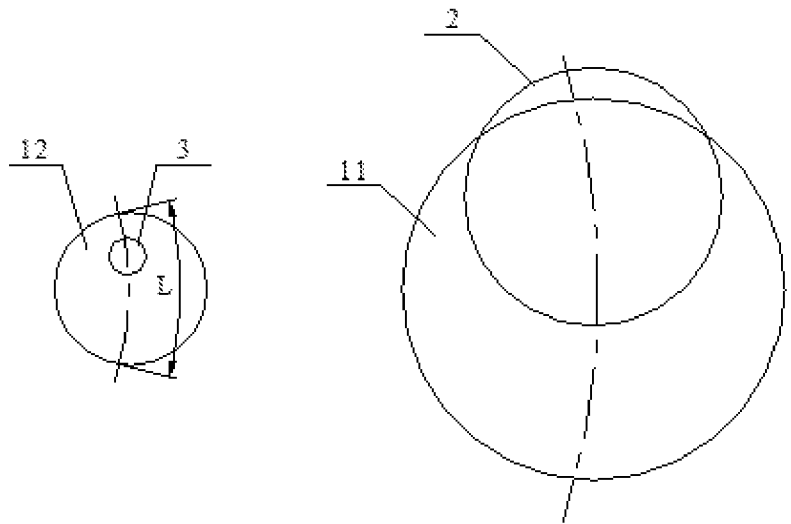
FIG. 3 is a schematic view showing a relationship between a locking structure and detecting structure according to an embodiment.

Generally, at a certain time instant in the rotation of the rotor, the sensor (the optical quantity detecting member 3) feedback no signal, as shown in FIG. 3, that is, the signal acquisition path of the sensor is directed to the detecting hole 12, but the locking pin 2 and the detecting hole 12 are not exactly aligned. Preferably, as shown in FIG. 2, the position signals include at least three position signals, which are sequentially acquired in the rotation of the rotor, so as to further improve the control accuracy.

A first position signal is a position signal acquired in a case that the signal acquisition path of the detecting portion is directed to a physical portion of the detecting reference member (the rotor 1) that is on an upper side of the detecting hole, as shown in a top sub-figure of FIG. 2.

A second position signal is a position signal acquired in a case that the signal acquisition path of the detecting portion is directed to the detecting hole, as shown in a middle sub-figure of FIG. 2.

A third position signal is a position signal acquired in a case that the signal acquisition path of the detecting portion is directed to a physical portion of the detecting reference member that is on a lower side of the detecting hole, as shown in a bottom sub-figure of FIG. 2.

The signal processing amount directly affects the system processing computation amount, thereby directly affecting the processing efficiency. The above three position signals according to a preferred embodiment of the present disclosure can maximize the processing efficiency of the alignment while ensuring the alignment accuracy. Specifically, the control member 4 is configured to output a first control instruction to the driving member of the rotor 5 for rotating a preset angle toward a second direction (clockwise or counterclockwise) according to the first position signal, the second position signal and the third position signal that are acquired in the rotation of the rotor 1 in a first direction (counterclockwise or clockwise accordingly); where the preset angle is a half of a rotation angle L of the detecting portion of the optical quantity detecting member 3 rotatable in the detecting hole 12 with respect to the rotor.

It should be noted that the above embodiments of the present embodiment are not limited to the configuration that twelve locking holes, two locking pins and one optical quantity detecting member as shown in FIG. 1. It should be understood that the solutions whose key ideas are t consistent with this solution fall within the protection scope of the disclosure.

The above embodiments are preferred embodiments of the present disclosure, it should be noted that various changes and improvements that can be made by those skilled in the art without departing from the principles of the present disclosure, fall within the protection scope of the present disclosure.

The invention claimed is:

1. A system for controlling a locking pin for a rotor of a generator, comprising:
   the locking pin that is fixedly arranged;
   the rotor, in which a locking hole is provided;
   a detecting reference member rotatable in synchronization with the rotor, wherein a detecting hole is provided in the detecting reference member, and the detecting hole is arranged in correspondence with the locking hole in a radial direction;
   an optical quantity detecting member, wherein the optical quantity detecting member is fixedly arranged with respect to the rotor; and
   a control member, configured to output a first control instruction to a driving member of the rotor based on at least three position signals of the detecting hole acquired by the optical quantity detecting member, to align the locking pin with the locking hole,
   wherein a plurality of locking holes and a plurality of detecting holes are uniformly distributed in a circumferential direction, and a diameter of a reference circle of the detecting hole is smaller than a diameter of a reference circle of the locking hole.

2. The system for controlling the locking pin for the rotor of the generator according to claim 1, wherein the control member is further configured to output a second control instruction to a driving member of the locking pin to lock the rotor according to the position signals of the detecting hole acquired by the optical quantity detecting member.

3. The system for controlling the locking pin for the rotor of the generator according to claim 1, wherein the at least three position signals, which are sequentially acquired in a rotation of the rotor, comprise:
   a first position signal, being a position signal acquired in a case that a signal acquisition path of a detecting portion of the optical quantity detecting member is directed to a physical portion of the detecting reference member that is on an upper side of the detecting hole;
   a second position signal, being a position signal acquired in a case that the signal acquisition path of the detecting portion is directed to the detecting hole; and
   a third position signal, being a position signal acquired in a case that the signal acquisition path of the detecting portion is directed to a physical portion of the detecting reference member that is on a lower side of the detecting hole.

4. The system for controlling the locking pin for the rotor of the generator according to claim 3, wherein the control member is configured to output the first control instruction to the driving member of the rotor for rotating a preset angle toward a second direction according to the first position signal, the second position signal and the third position signal that are acquired in the rotation of the rotor in a first direction; wherein the preset angle equals to a half of a rotation angle of the detecting portion of the optical quantity detecting member rotatable in the detecting hole with respect to the rotor.

5. The system for controlling the locking pin for the rotor of the generator according to claim 1, wherein the optical quantity detecting member is one of an infrared sensor, an ultrasonic sensor and a laser sensor.

6. The system for controlling the locking pin for the rotor of the generator according to claim 5, wherein the detecting portion of the optical quantity detecting member is arranged to be exactly aligned with the reference circle of the detecting hole.

7. The system for controlling the locking pin for the rotor of the generator according to claim 1, wherein the detecting reference member is the rotor and the optical quantity detecting member is fixedly arranged on a fixed shaft of the generator.

8. The system for controlling the locking pin for the rotor of the generator according to claim 2, wherein the position signal comprises at least three position signals, which are sequentially acquired in a rotation of the rotor; wherein the at least three position signals comprise:
   a first position signal, being a position signal acquired in a case that a signal acquisition path of a detecting portion of the optical quantity detecting member is directed to a physical portion of the detecting reference member that is on an upper side of the detecting hole;
   a second position signal, being a position signal acquired in a case that the signal acquisition path of the detecting portion is directed to the detecting hole; and
   a third position signal, being a position signal acquired in a case that the signal acquisition path of the detecting portion is directed to a physical portion of the detecting reference member that is on a lower side of the detecting hole.

9. A method for controlling a locking pin for a rotor of a generator, comprising:
   setting a detecting reference member rotatable in synchronization with the rotor, wherein a detecting hole is provided in the detecting reference member, and the detecting hole is arranged in correspondence with the locking hole in a radial direction, wherein a plurality of locking holes and a plurality of detecting holes are uniformly distributed in a circumferential direction, and a diameter of a reference circle of the detecting hole is smaller than a diameter of a reference circle of the locking hole;

determining a preset angle, wherein the preset angle equals to a rotation angle of a detecting position rotatable in a detecting hole with respect to the rotor; and outputting, according to a position signal of the detecting hole acquired by an optical quantity detecting member, a first control instruction to a driving member of the rotor to align the locking pin with the locking hole.

10. The method for controlling the locking pin for the rotor of the generator according to claim 9, wherein after the outputting a first control instruction to a driving member of the rotor, the method further comprises:

outputting a second control instruction to a driving member of the locking pin to lock the rotor.

11. The method for controlling the locking pin for the rotor of the generator according to claim 9, wherein the position signal comprises at least three position signals, which are sequentially acquired by a rotation of the rotor; wherein the at least three position signals comprise:

a first position signal, being a position signal acquired in a case that a signal acquisition path of a detecting portion of the optical quantity detecting member is directed to a physical portion of a detecting reference member that is on an upper side of the detecting hole;

a second position signal, being a position signal acquired in a case that the signal acquisition path of the detecting portion is directed to the detecting hole; and a third position signal, being a position signal acquired in a case that the signal acquisition path of the detecting portion is directed to a physical portion of the detecting reference member that is on a lower side of the detecting hole.

12. The method for controlling the locking pin for the rotor of the generator according to claim 11, further comprising:

outputting, by the control member, the first control instruction to the driving member of the rotor for rotating the preset angle toward a second direction according to the first position signal, the second position signal and the third position signal that are acquired in the rotation of the rotor in a first direction;

wherein the preset angle equals to a half of a rotation angle of the detecting portion of the optical quantity detecting member rotated in the detecting hole with respect to the rotor.

13. The method for controlling the locking pin for the rotor of the generator according to claim 10, wherein the position signal comprises at least three position signals, which are sequentially acquired by a rotation of the rotor; wherein the at least three position signals comprise:

a first position signal, being a position signal acquired in a case that a signal acquisition path of a detecting portion of the optical quantity detecting member is directed to a physical portion of a detecting reference member that is on an upper side of the detecting hole;

a second position signal, being a position signal acquired in a case that the signal acquisition path of the detecting portion is directed to the detecting hole; and a third position signal, being a position signal acquired in a case that the signal acquisition path of the detecting portion is directed to a physical portion of the detecting reference member that is on a lower side of the detecting hole.

* * * * *